Patented Dec. 13, 1949

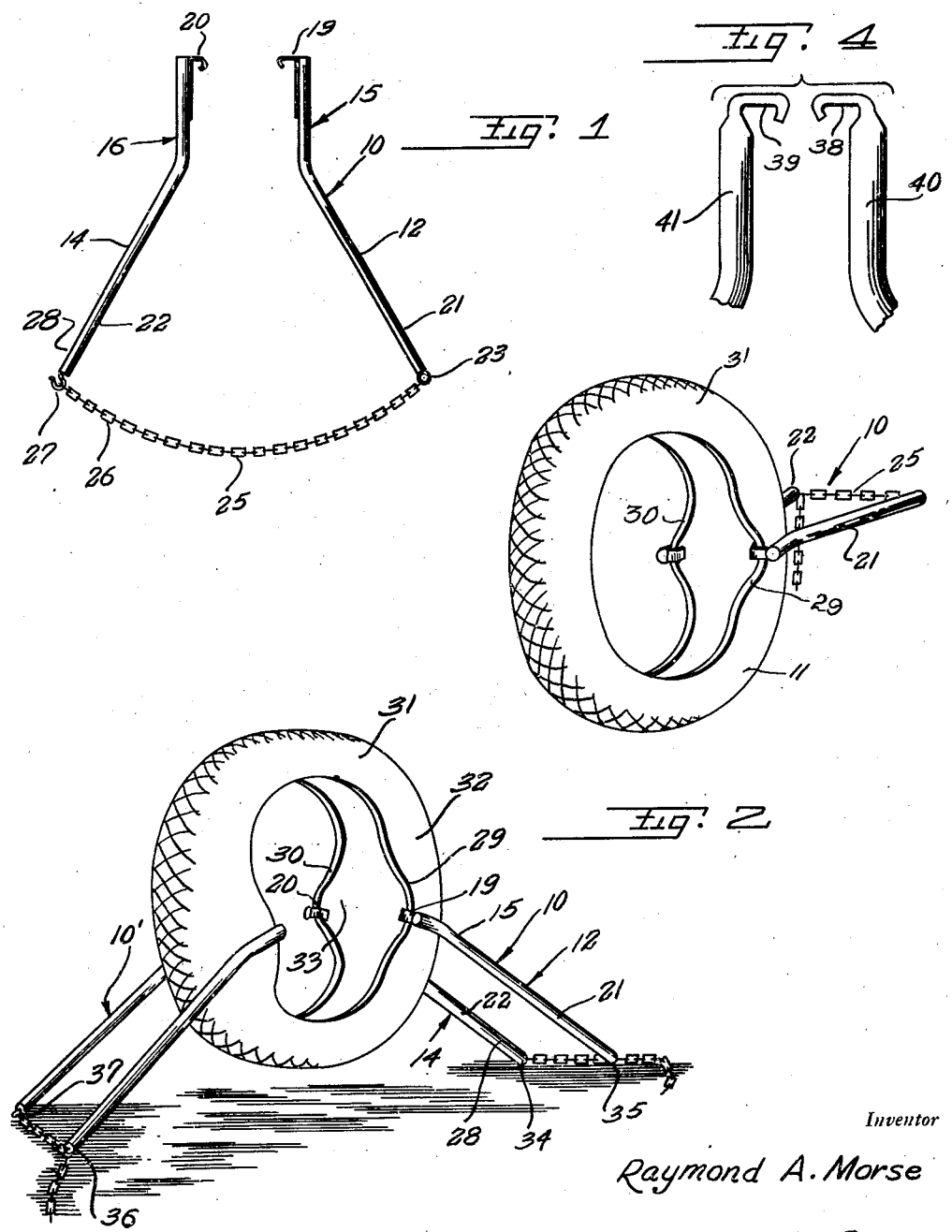

2,491,327

UNITED STATES PATENT OFFICE 2,491,327

TIRE SPREADER AND SUPPORT

Raymond A. Morse, Linden, Tex.

Application December 21, 1945, Serial No. 636,436

1 Claim. (Cl. 254—50.4)

My invention as described herein, and illustrated in the accompanying drawings, consists of a tire tool, an object of which is to provide a simple, inexpensive device by means of which a tire may be easily and quickly spread.

Another object of my invention is to provide a device for spreading the sides of a tire apart and for supporting the tire in vertical position.

A further object of this invention is to provide a pair of lever hooks by means of which a tire may be spread.

A still further object of the invention is the provision of means whereby the side walls of a tire may be spread and held apart and for holding it in vertical position for inspection, cleansing and repairing the same.

Other features and advantages will become more readily apparent from the following description and the accompanying illustrative drawings in which:

Figure 1 is a plan view of my device,

Figure 2 is a perspective view illustrating one application thereof,

Figure 3 is a similar view illustrating another application of the invention, and Figure 4 is an enlarged detail of hook ends of the tool of a slightly modified form.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device which is to be limited only in accordance with the appended claims. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to my invention and 11, indicates a tire spread thereby. As clearly shown by the particular form of the invention used for illustration purposes my invention consists of a pair of identically formed rods 12 and 14 similarly bent intermediate their ends to provide short end portions 15 and 16, to which are permanently fixed the shanks of inwardly projecting hooks 19 and 20, and integral relatively long levers 21 and 22, the lever 21 terminating in an eye 23, to which is secured the end of a chain 25. The free end 26 of the chain may be caught in the hook 27 terminating end 28 of lever 22. Each lever and the corresponding end portion and hook are coplanar and the hooks extend from the sides of the end portions opposite from the corresponding levers.

The operation of the device above described is clearly shown in Figures 2 and 3, of the drawings. When the hooks 19 and 20 are caught over the edges 29 and 30 of the tire 31 and the ends of the levers remote from said hooks drawn together, said end portions bear against the side walls 32 and 33 of the tire which act as fulcrums for said end portions, whereby the said walls are spread apart. By hooking a desired link of chain 25 to the hook 27, the device is secured in its spreading position, a similar device 10', being attached to the opposite side of the tire. By using terminals 34, 35, 36 and 37, of the levers as feet the device may be set thereon to support the tire in vertical position (see Figure 3.) When it is not desired to set the tire up only one device will be needed (see Figure 2).

In Figure 4, of the drawings, I show a slight modification in which the hooks 38 and 39, of the end portions 40 and 41, of the device are integrally formed thereon, this being a preferred method of manufacture. The hook and eye ends (not shown) of the levers may also be made integral therewith.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A tire spreader comprising a pair of rods each bent intermediate the ends thereof through an acute angle to provide similar short end portions engageable exteriorly on the side walls of a tire and levers integral with said end portions, tire-engaging hooks on one pair of corresponding ends of said portions, and cable means adjustably and directly securing the other pair of ends together.

RAYMOND A. MORSE.

REFERENCES CITED

The following references are of record in the file of this patent:

UNITED STATES PATENTS

| Number | Name | Date |
|---|---|---|
| 1,349,990 | Wilbur | Aug. 17, 1920 |
| 1,373,834 | Rogers | Apr. 5, 1921 |
| 1,378,696 | Lewsen | May 17, 1921 |
| 1,612,229 | Snodgrass | Dec. 28, 1926 |
| 2,007,870 | Mangel | July 9, 1935 |
| 2,212,059 | Glover | Aug. 20, 1940 |